(12) United States Patent
Belfer

(10) Patent No.: US 6,234,640 B1
(45) Date of Patent: May 22, 2001

(54) FIBER OPTIC REPLICANT LAMP

(76) Inventor: Bruce D. Belfer, 1703 Valley Rd., Ocean, NJ (US) 07712

( * ) Notice: Subject to any disclaimer, the term of this patent is extended or adjusted under 35 U.S.C. 154(b) by 0 days.

(21) Appl. No.: 09/083,316

(22) Filed: May 22, 1998

(51) Int. Cl.[7] ........................................................ F21V 7/00
(52) U.S. Cl. .............................. 362/32; 362/308; 362/347
(58) Field of Search ............................. 362/32, 307, 308, 362/347, 350, 364, 551, 576, 581

(56) References Cited

U.S. PATENT DOCUMENTS 5,278,731 * 1/1994 Davenport et al. ................... 362/551
5,873,644 * 2/1999 Roessner et al. ..................... 362/551

* cited by examiner

Primary Examiner—Darren Schuberg
(74) Attorney, Agent, or Firm—Ezra Sutton

(57) ABSTRACT

A fiber optic lamp includes a lamp housing having a stem section with a passageway therein and a reflector section having a reflective surface. The lamp housing also has first and second circular ledges for receiving and holding in place at least one lens within the lamp housing. A fiber optic cable is provided having a first end for insertion into the passageway of the lamp housing for transmitting light. The second end of the fiber optic cable is connected to a light pump having a light source therein for generating and transmitting light through the fiber optic cable. The fiber optic cable is connected to a socket member of a fixture housing for mounting the stem section of the lamp housing in the fixture housing.

42 Claims, 10 Drawing Sheets

FIBER OPTIC REPLICANT LAMP

FIELD OF THE INVENTION

This invention relates to a fiber optic replicant lamp as a replacement for standard incandescent light bulbs or reflector lamps (e.g. MR11, MR16 etc.). More particularly, the replicant lamps each include a fiber optic cable attached to a light pump having a single light source for the lighting of a plurality of lighting fixtures from that single light source via the light pump.

BACKGROUND OF THE INVENTION

It is well known in the art that incandescent light bulbs, fluorescent lamps, halogen reflector lamps and the like have a finite life-span of about 2,000 hours of operation, such that these bulbs and lamps have to be replaced on an ongoing basis. This becomes a very tedious, time-consuming and expensive process when changing bulbs and lamps in thousands of lighting fixtures in a department store, theater, disco, museum, etc.

There remains a need for a fiber optic replicant lamp that would replace standard incandescent light bulbs, fluorescent lamps, halogen reflector lamps, and the like in order to eliminate the need and expense of changing the aforementioned bulbs and lamps. In addition, the fiber optic replicant lamp would generate no heat. Further, the users of fiber optic replicant lamps would save on energy and maintenance, as well as have more flexibility in arranging the plurality of lighting fixtures having the fiber optic replicant lamps therein.

DESCRIPTION OF THE PRIOR ART

Lighting fixture housings, lamps, and luminaires having various designs, structures, configurations and materials of construction have been disclosed in the prior art. For example, U.S. Pat. No. 5,268,977 shows a fiber optic luminaire in which the housing has a fiber optic light source.

U.S. Pat. No. 5,384,881 shows a fiber optic luminaire having 5 fiber optic lighting units mounted therein, which are each independently adjustable to control the emitted light beam.

U.S. Pat. No. 4,953,549 shows a fiber optic lighting fixture wherein the light source is solar light supplied to the fiber optic element.

U.S. Pat. No. 5,303,125 shows a plurality of fiber optic luminaires ganged together, all receiving light from the same light source.

These prior art patents do not teach or disclose the reconfiguration of conventional lamps (e.g. MR11, MR16 and the like) into a fiber optic replicant lamp which can then be mounted in the same locations of lighting fixtures having the conventional lamps. In addition, the prior art patents do not teach or disclose a plurality of fiber optic replicant lamps each having a fiber optic cable contained therein connected to a common light pump having a single light source.

Accordingly, it is an object of the present invention to provide a fiber optic replicant lamp as a replacement for standard incandescent light bulbs or reflector lamps, such as a MR11, MR16 or PAR lamps and the like.

Another object of the present invention is to provide a fiber optic replicant lamp having a fiber optic cable/bundle attached to the stem section therein for providing light within the replicant lamp.

Another object of the present invention is to provide a fiber optic replicant lamp wherein the fiber optic cable/bundle is attached at the other end to a light pump having at least one light source.

Another object of the present invention is to provide a fiber optic replicant lamp that does not generate internal heat within the replicant lamp.

Another object of the present invention is to provide a light pump having a plurality of fiber optic cables/bundles attached to a plurality of fiber optic replicant lamps for producing light from a single light source (such as an incandescent light bulb) via the light pump. Additionally, the single light source can be located at a remote location and changed every 2000 hours and thereby avoid the need for access to the light fixtures having the replicant lamp therein.

Another object of the present invention is to provide a fiber optic replicant lamp that saves on energy and maintenance costs, as well as having more flexibility by the user in arranging the plurality of lighting fixtures having the fiber optic replicant lamps therein.

Another object of the present invention is to provide a fiber optic replicant lamp that can be used within any type of lighting fixture housing.

A still further object of the present invention is to provide a fiber optic replicant lamp that can be mass produced in an automated and economical manner and is readily affordable by the user.

SUMMARY OF THE INVENTION

In accordance with the present invention, there is provided a fiber optic lamp, as a replacement for conventional vacuum lamps, gas filled lamps or halogen lamps. The fiber optic lamp includes a lamp housing having a stem section with a passageway therein and a reflector section having a reflective surface. The lamp housing may also have first and/or second circular ledges for receiving and holding in place at least one lens within the lamp housing. A fiber optic cable is provided having a first end for insertion into the passageway of the lamp housing for transmitting light. The second end of the fiber optic cable is connected to a light pump having a light source therein for generating and transmitting light through the fiber optic cable. The fiber optic cable is connected to a socket member of a fixture housing for mounting the stem section of the lamp housing in the fixture housing.

BRIEF DESCRIPTION OF THE DRAWINGS

Further objects, features, and advantages of the present invention will become apparent upon the consideration of the following detailed description of the presently-preferred embodiment when taken in conjunction with the accompanying drawings, wherein.

DETAILED DESCRIPTION OF THE PREFERRED EMBODIMENT

The fiber optic replicant lamp 10 and its component parts of the preferred and alternate embodiments of the present invention are represented in detail by FIGS. 2a to 15. Prior art conventional lamps are represented in detail by FIGS. 1a, 1b and 1c of the drawings.

Figure 1A:
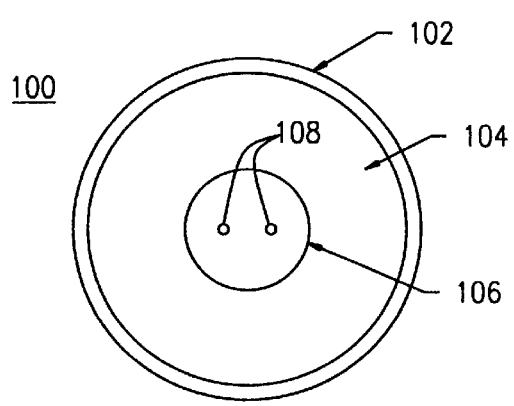
FIG. 1a is a rear plan view of a conventional lamp of the prior art showing the lamp housing having a reflector section and a stem section with metal connector prongs for connecting to a lighting fixture socket (not shown) therein.
Figure 2A:
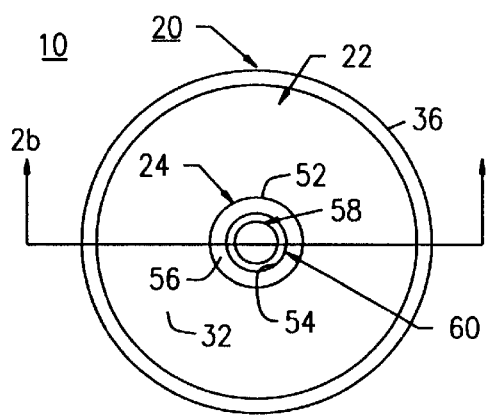
FIG. 2a is a rear plan view of the fiber optic replicant lamp of the preferred embodiment of the present invention showing the lamp housing having a reflector section and a stem section with an interior passageway for receiving the fiber optic cable therein.
Figure 1B:
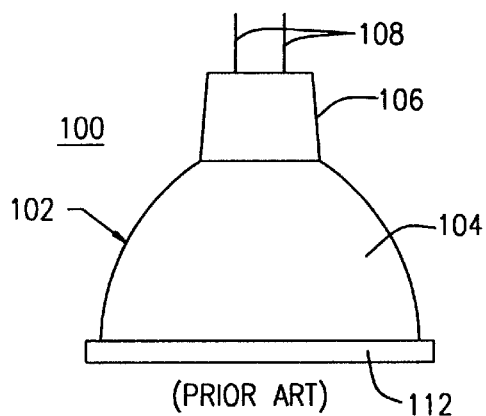
FIG. 1b is a side elevational view of a conventional lamp of the prior art showing the lamp housing having a reflector section with a lens cover and a stem section with metal connector prongs.
Figure 1C:
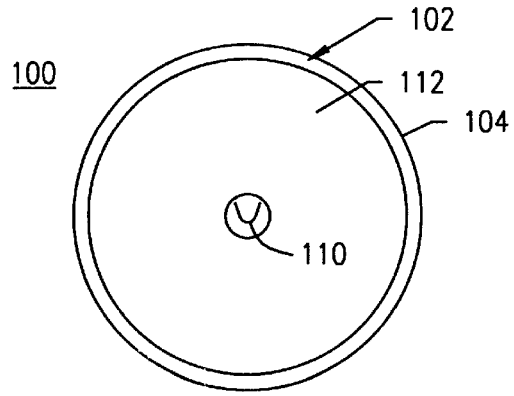
FIG. 1c is a front plan view of a conventional lamp of the prior art showing the lamp housing having a reflector section with a filament component and a lens cover.
Figure 2C:
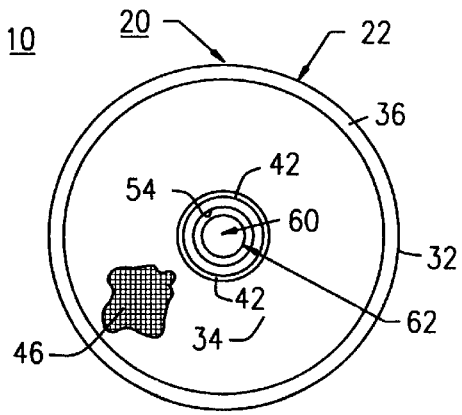
FIG. 2c is a front plan view of the fiber optic replicant lamp of the preferred embodiment of the present invention showing the lamp housing having a reflector section with a reflective surface thereon and a stem section with an interior passageway therein for receiving the fiber optic cable therein.
Figure 3:
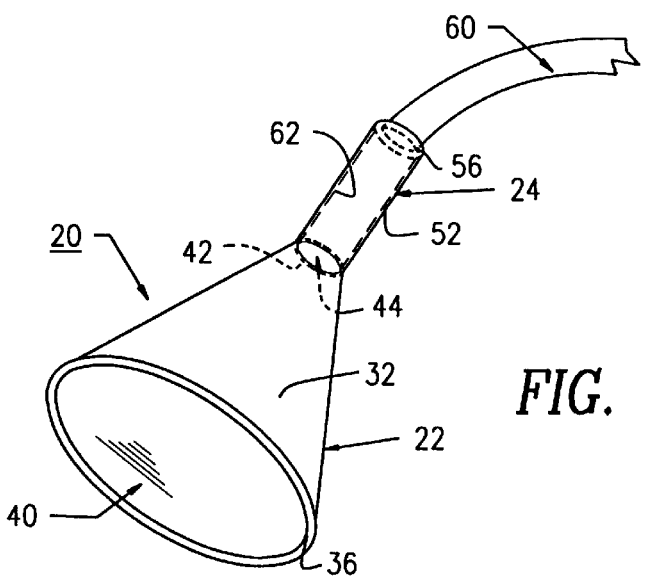
FIG. 3 is a front perspective view of the fiber optic replicant lamp of the present invention showing the lamp housing having a reflector section with a cover lens thereon and a stem section with an interior passageway therein for receiving the fiber optic cable therein.
Figure 6A:
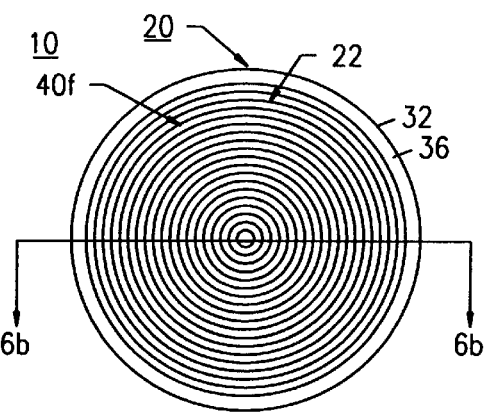
FIG. 6a is a front plan view of the fiber optic replicant lamp of the present invention showing the lamp housing having a reflector section with a Fresnel-type lens mounted therein.

A conventional lamp 100, as shown in the prior art drawings of FIGS. 1a to 1c, includes a glass housing 102 having a reflector section 104 and a stem section 106 with metal prongs 108 for insertion into a socket member (not shown) of a lighting fixture (not shown). The reflector section 104 is under vacuum and includes a filament member 110 for producing light within the reflector section 104, and a lens cover 112. The reflector section 104 can heat up as high as 600° F.

Figure 2B:
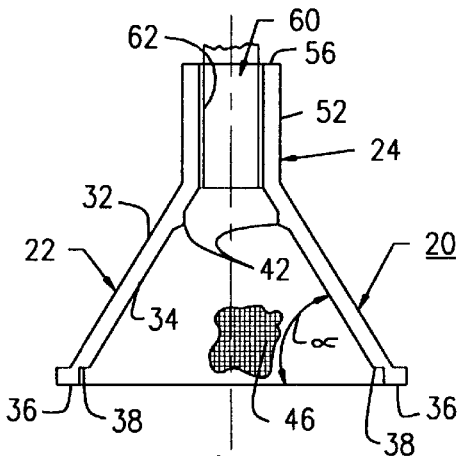
FIG. 2b is a cross-sectional view of the fiber optic replicant lamp of the preferred embodiment of the present invention taken along lines 2b—2b of FIG. 2a showing the lamp housing having a reflector section with a reflective surface thereon and a stem section with an interior passageway therein for receiving the fiber optic cable therein.
Figure 5A:
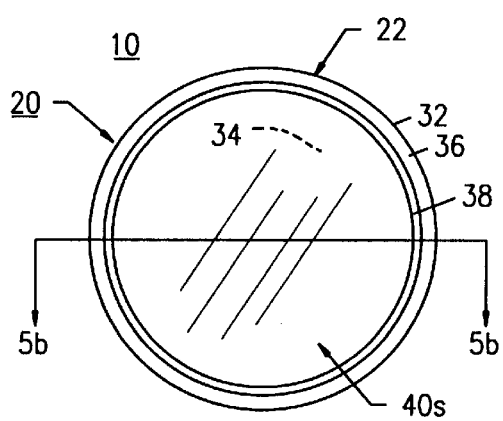
FIG. 5a is a front plan view of the fiber optic replicant lamp of the present invention showing the lamp housing having a reflector section with a conventional convex lens mounted therein.
Figure 5B:
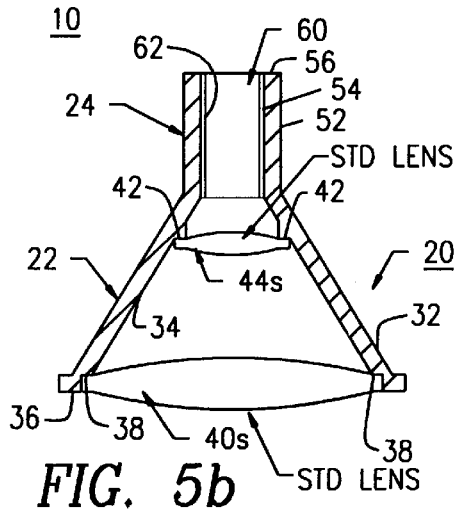
FIG. 5b is a cross-sectional view of the fiber optic replicant lamp of the present invention taken along lines 5b—5b of FIG. 5a showing the lamp housing having a reflector section with a first convex lens mounted therein; and a stem section with a second convex lens mounted therein and with an interior passageway for holding in place the fiber optic cable housing having the fiber optic cable therein.
Figure 6B:
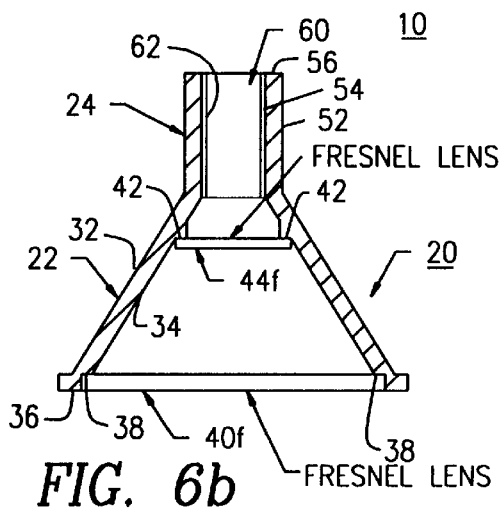
FIG. 6b is a cross-sectional view of the fiber optic replicant lamp of the present invention taken along lines 6b—6b of FIG. 6a showing the lamp housing having a reflector section with a first Fresnel-type lens mounted therein; and a stem section with a second Fresnel-type lens mounted therein and with an interior passageway for holding in place the fiber optic cable housing therein.

The fiber optic replicant lamp 10 includes a lamp housing 20 having a reflector section 22 and a stem section 24 being integrally attached. Reflector section 22 includes an outer conical wall surface 32, an inner conical wall surface 34 and a first outer perimeter edge 36 having a first horizontal inner circular ledge 38 for holding in place a first lens cover 40. Inner conical wall surface 34 includes a second horizontal inner circular ledge 42 for holding in place a second lens cover 44. Lens covers 40 and 44 may be standard convex lenses 40s and 44s or Fresnel™ type lenses 40f and 44f, as shown in FIGS. 5b and 6b, respectively. Inner conical wall surface 34 also includes a reflector/reflective surface 46 selected from the group consisting of metalized plastic, phosphorous coatings, polished metals and combinations thereof. The conical wall surface 34 has an angle the range of 50 to 65° degrees with respect to the perimeter edge 36 of lamp housing 20, as shown in FIG. 2b of the drawings.

Figure 11A:
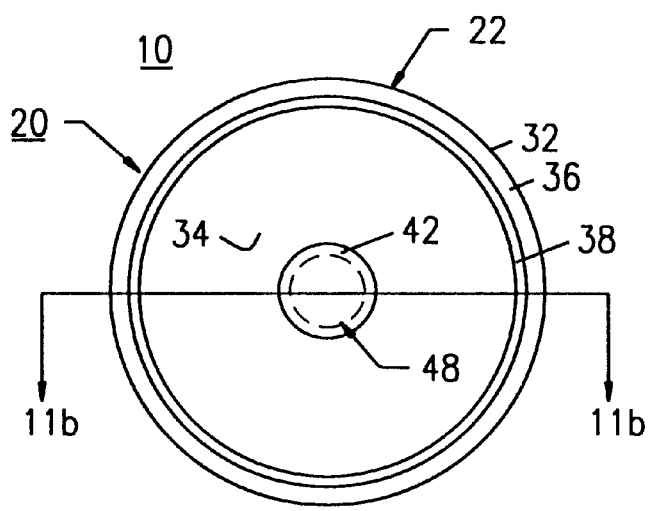
FIG. 11a is a front plan view of the fiber optic replicant lamp of the present invention showing the lamp housing having a reflector section with a spherical lens mounted therein.
Figure 11B:
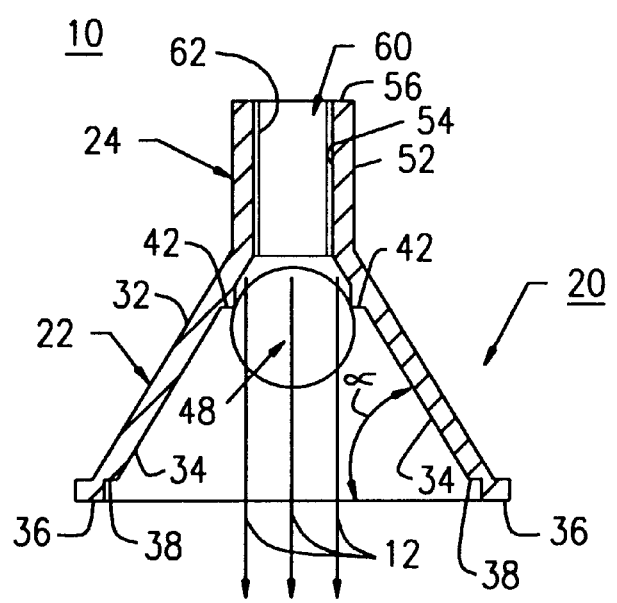
FIG. 11b is a cross-sectional view of the fiber optic replicant lamp of the present invention taken along lines 11b—11b of FIG. 11a showing the lamp housing having a reflector section with a spherical lens mounted therein; and a stem section with an interior passageway for holding in place the fiber optic cable housing therein.

Alternatively, the second horizontal inner circular ledge 42 can hold in place a ball/spherical lens 48, as shown in FIGS. 11a and 11b of the drawings. Spherical lens 48 is used as a collimator device in which to transmit parallel beams/rays of light 12 from the spherical lens 48 to a particular area, such that the path of light beams/rays 12 are nearly parallel as they emerge from the spherical lens 48, as depicted by FIG. 11b of the drawings.

Figure 8A:
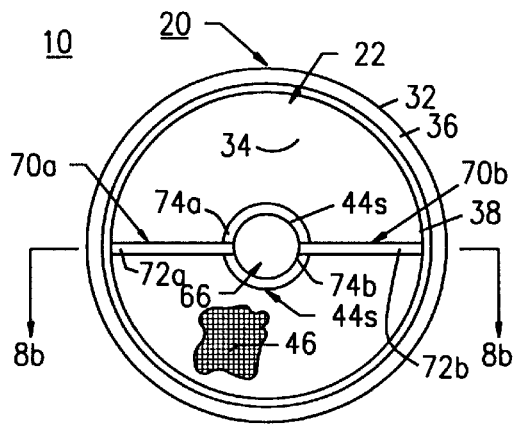
FIG. 8a is a front plan view of the fiber optic replicant lamp of the present invention showing the lamp housing having a reflector section with a reflective surface thereon, and a single smaller convex lens mounted into the retaining ledge of the stem section (not shown)
Figure 8B:
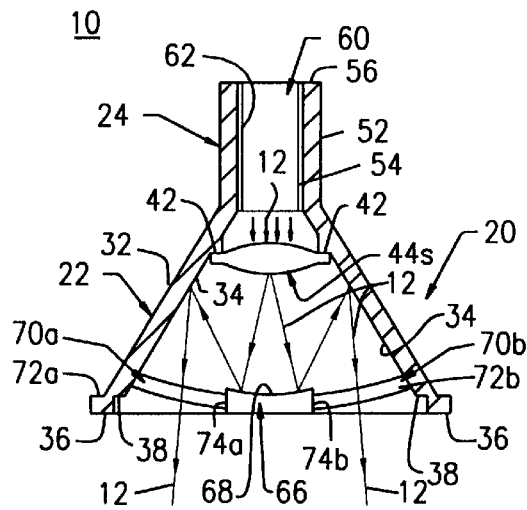
FIG. 8b is a cross-sectional view of the fiber optic replicant lamp of the present invention taken along lines 8b—8b of FIG. 8a showing the lamp housing having a reflector section with a reflective surface thereon, a stem section having a retaining ledge for holding a single smaller convex lens thereon, and a fiber optic cable housing having a fiber optic cable therein being received within interior passageway of the stem section.
Figure 9A:
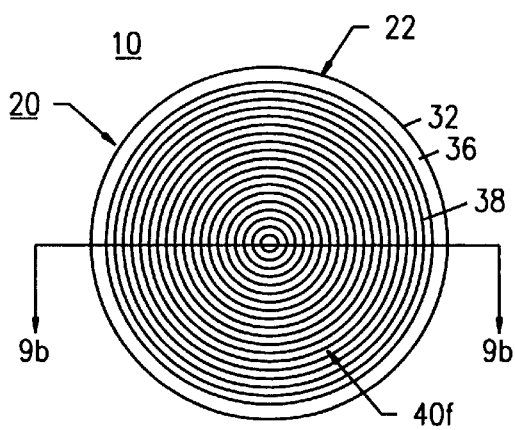
FIG. 9a is a front plan view of the fiber optic replicant lamp of the present invention showing the lamp housing having a reflector section with a Fresnel-type lens mounted therein.
Figure 9B:
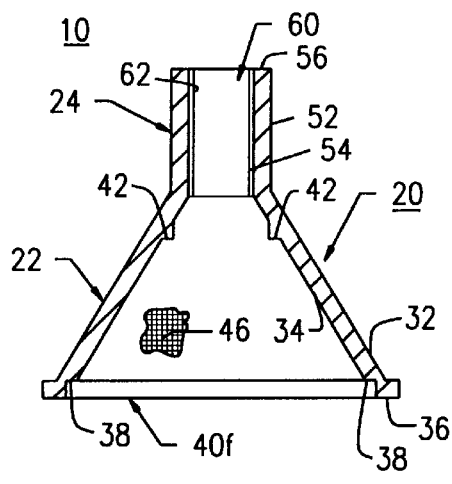
FIG. 9b is a cross-sectional view of the fiber optic replicant lamp of the present invention taken along lines 9b—9b of FIG. 9a showing the lamp housing having a reflector section with a single Fresnel-type lens mounted therein, and a stem section with an interior passageway for holding in place the fiber optic cable housing having the fiber optic cable therein.

Reflector section 22, as shown in FIGS. 8a and 8b of the drawings, may also include a reflector member 66 having a reflective surface 68 for reflecting light beams 12 from the standard convex lens 44s off of the reflective surface 68 of reflective member 66 in order to reduce glare from the light beams 12 coming from the reflective surface 46 of reflector section 22. As shown in FIG. 8b, the light beams 12 are reflected from the reflector member 66 to the reflective surface 46 of the inner conical wall surface 34 of stem section 22 where then light beams 12 are then reflected off of reflective surface 46 of wall surface 34, such that these reflected light beams 12 light-up a particular area with less glare. Reflector member 66 is held in place by a pair of bridge structure members 70a and 70b. Bridge structure members 70a and 70b, as shown in FIG. 8b of the drawings, are attached at one end 72a and 72b to the inner conical wall surface 35 (180° degrees apart in location), and at the other end 74a and 74b to the reflector member 66. Additionally, reflector section 22 may be formed into a spherical-shaped configuration, an ovoidal-shaped configuration or an ellipsoidal-shaped configuration.

Figure 4:
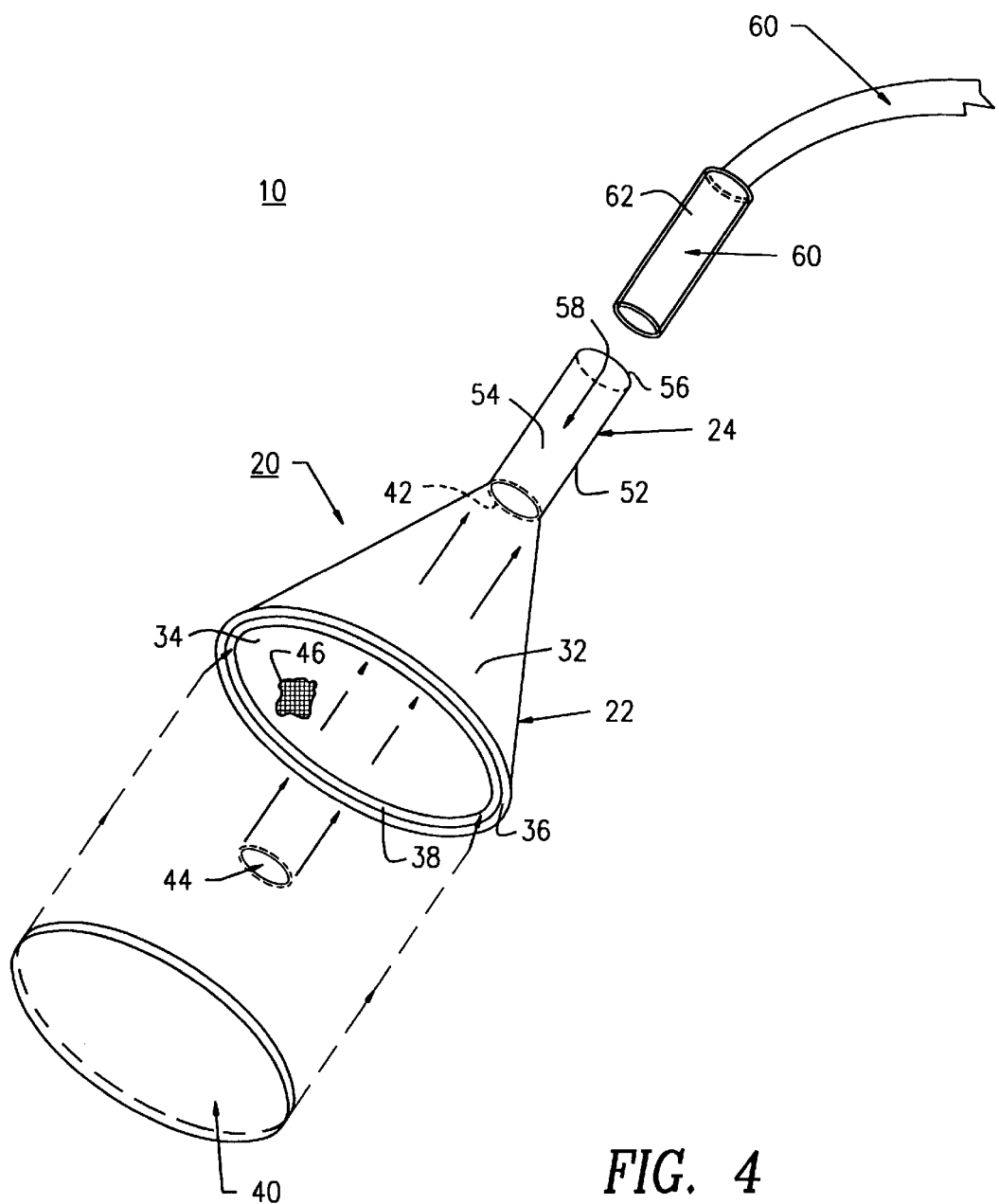
FIG. 4 is a front exploded perspective view of the fiber optic replicant lamp of the present invention showing the lamp housing, the first cover lens, the reflector section having a retaining ledge for holding the first cover lens thereon, the stem section having a retaining ledge for holding the second cover lens thereon and having an interior passageway for holding in place the fiber optic cable housing, and the fiber optic housing with a fiber optic cable therein.
Figure 7A:
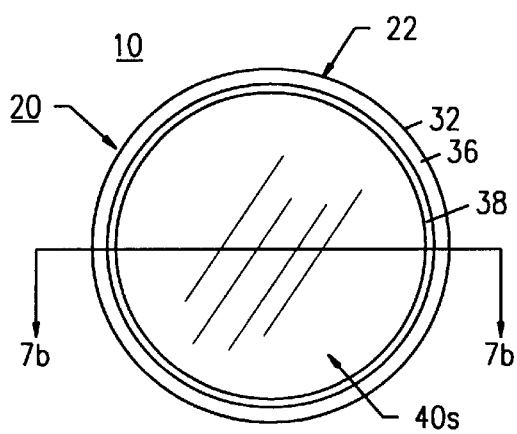
FIG. 7a is a front plan view of the fiber optic replicant lamp of the present invention showing the lamp housing having a reflector section with a conventional convex lens mounted therein.

Stem section 24 includes an outer cylindrical wall surface 52, an inner cylindrical wall surface 54 and outer perimeter edge 56. Stem section 24 also includes an interior cylindrical passageway 58 for receiving the cable housing 62 of the fiber optic cable/bundle 60 therethrough, as shown in FIG. 4 of the drawings.

Figure 12A:
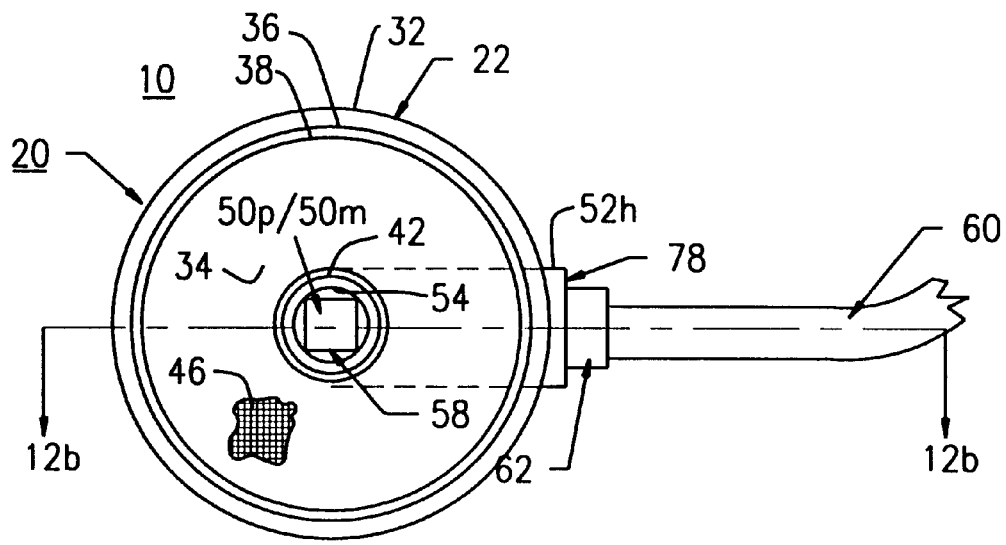
FIG. 12a is a front plan view of the fiber optic replicant lamp of the present invention showing the lamp housing having a reflector section with a prism or mirror lens mounted therein.
Figure 12B:
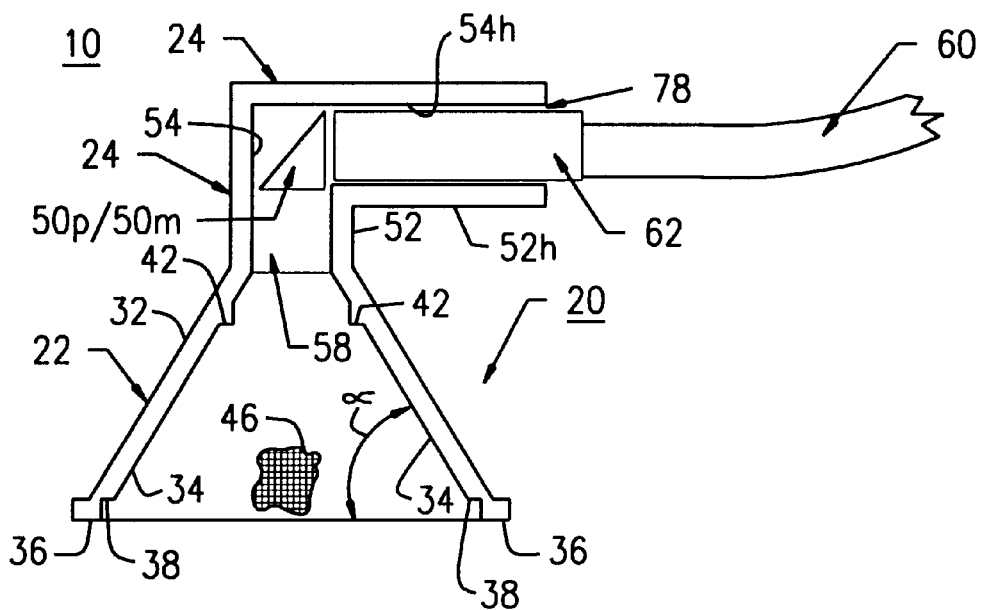
FIG. 12b is a cross-sectional view of the fiber optic replicant lamp of the present invention taken along lines 12b—12b of FIG. 12a showing the lamp housing having a reflector section, and an L-shaped stem section with a first interior passageway for holding in place the fiber optic cable housing having the fiber optic cable therein, and a second interior passageway for holding in place a prism or mirror lens therein.

In an alternate embodiment, as shown in FIGS. 12a and 12b of the drawings, the cable housing 62 of fiber optic bundle 60 is connected to the stem section 24 of the lamp housing 20 via an interior cylindrical passageway 78. Passageway 78 includes an exterior cylindrical wall surface 52h and an interior cylindrical wall surface 54h. Passageway 78 extends outwardly from passageway 58 at a right 90° degree angle from the stem section 24 of lamp housing 20, wherein interior passageway 78 is used for receiving the cable housing 62 of fiber optic bundle 60. In addition, passageway 78 includes a prism lens 50p or mirror lens 50m for reflecting the light beams 12 through interior passageway 58 of stem section 24 and then through the aforementioned lenses 44 and/or 40 if used.

Lamp housing 20 may be constructed of light-weight, heat resistant plastic or light-weight, shatter proof glass. Lamp housing 20 may be varied in size to effect more or less illumination from the fiber optic replicant lamp 10.

Figure 13:
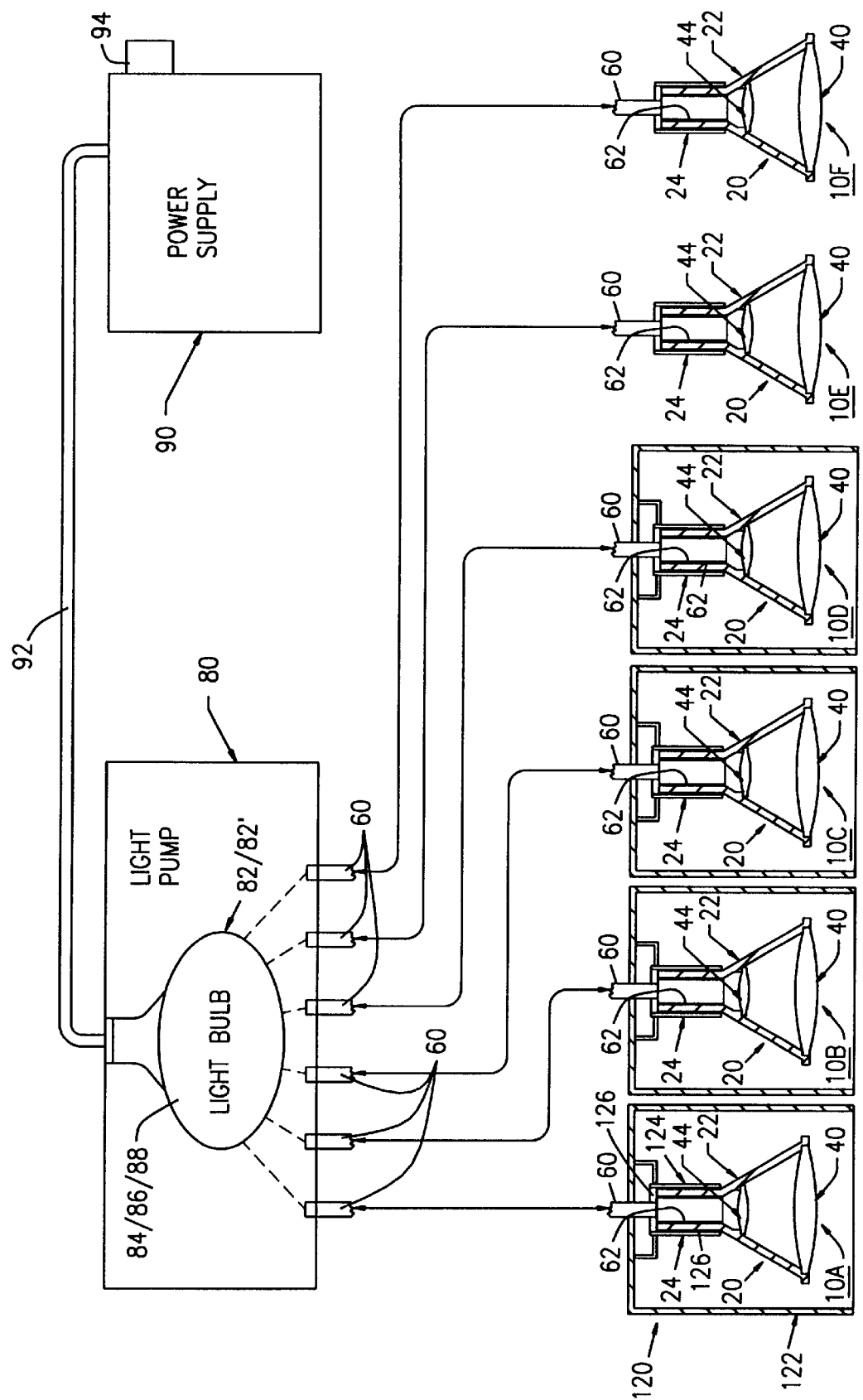
FIG. 13 is a schematic diagram of the fiber optic replicant lamp of the present invention showing a plurality of replicant lamps connected to a common light pump by a plurality of fiber optic cables, the light pump having a light source connected to a power supply by an electrical connection wire.

As shown in FIG. 13 of the drawings, fiber optic cables 60 are connected to light pump assembly 80 having a light source 82 therein, in the form of an incandescent bulb 84, a fluorescent lamp 86, or a halogen lamp 88 and the like. Light pump assembly 80 is connected to a plurality of fiber optic cables 60 for receiving light from light source 82 for providing light to each fiber optic replicant lamp 10 within each of the plurality of lighting fixtures 120. Fiber optic bundle/cable 60 may be made of a flexible, solid light-transmitting plastic cable or made of a plurality of strands joined together to form a fiber optic bundle for transmitting light beams 12 from the light source 82 via light pump assembly 80. Light pump member 80 is electrically connected to a power supply 90 via electrical connection wire 92.

Figure 14:
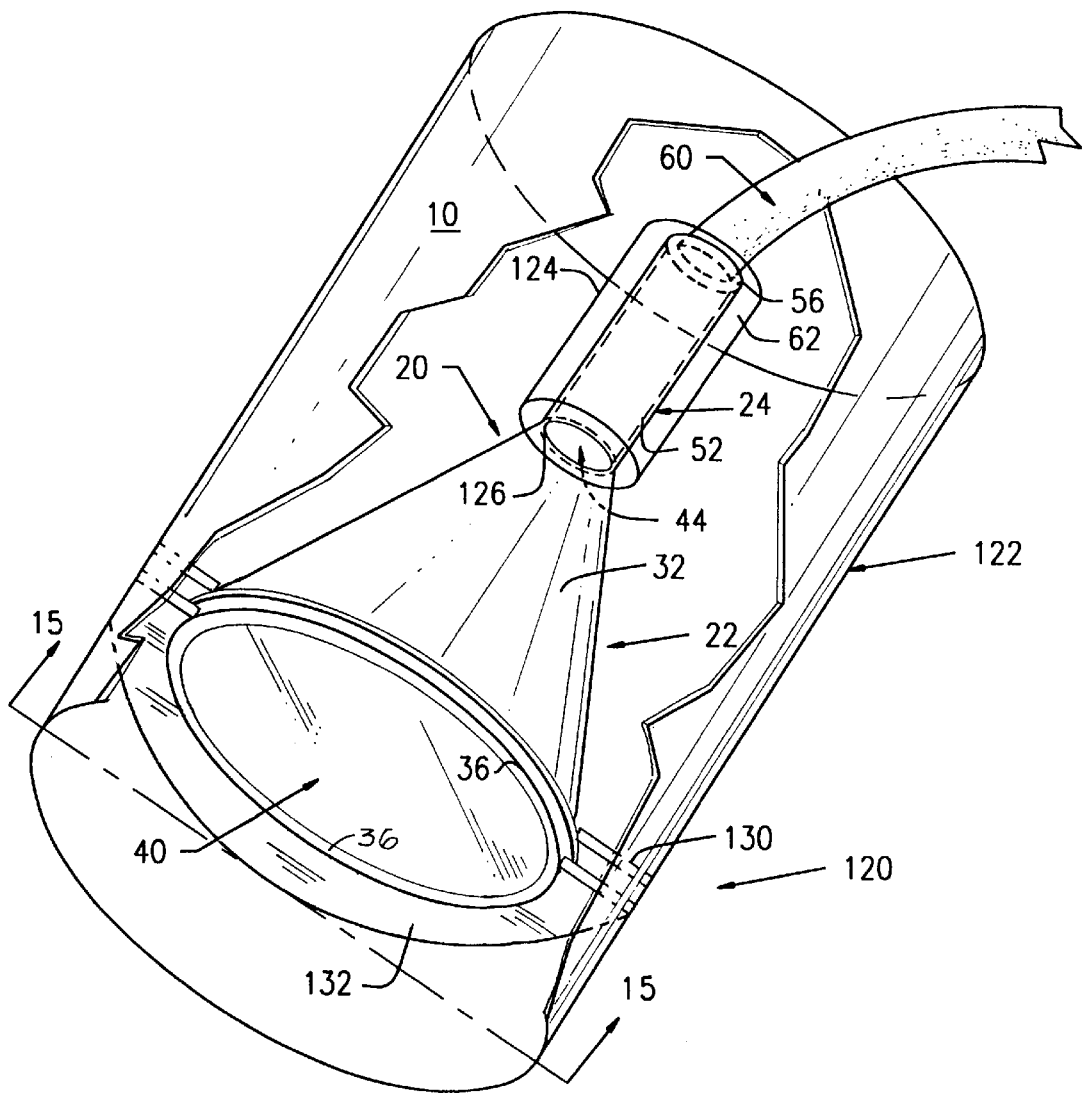
FIG. 14 is a front perspective view of the fiber optic replicant lamp of the present invention showing the replicant lamp mounted within a socket member of a fixture housing of the lighting fixture assembly.
Figure 15:
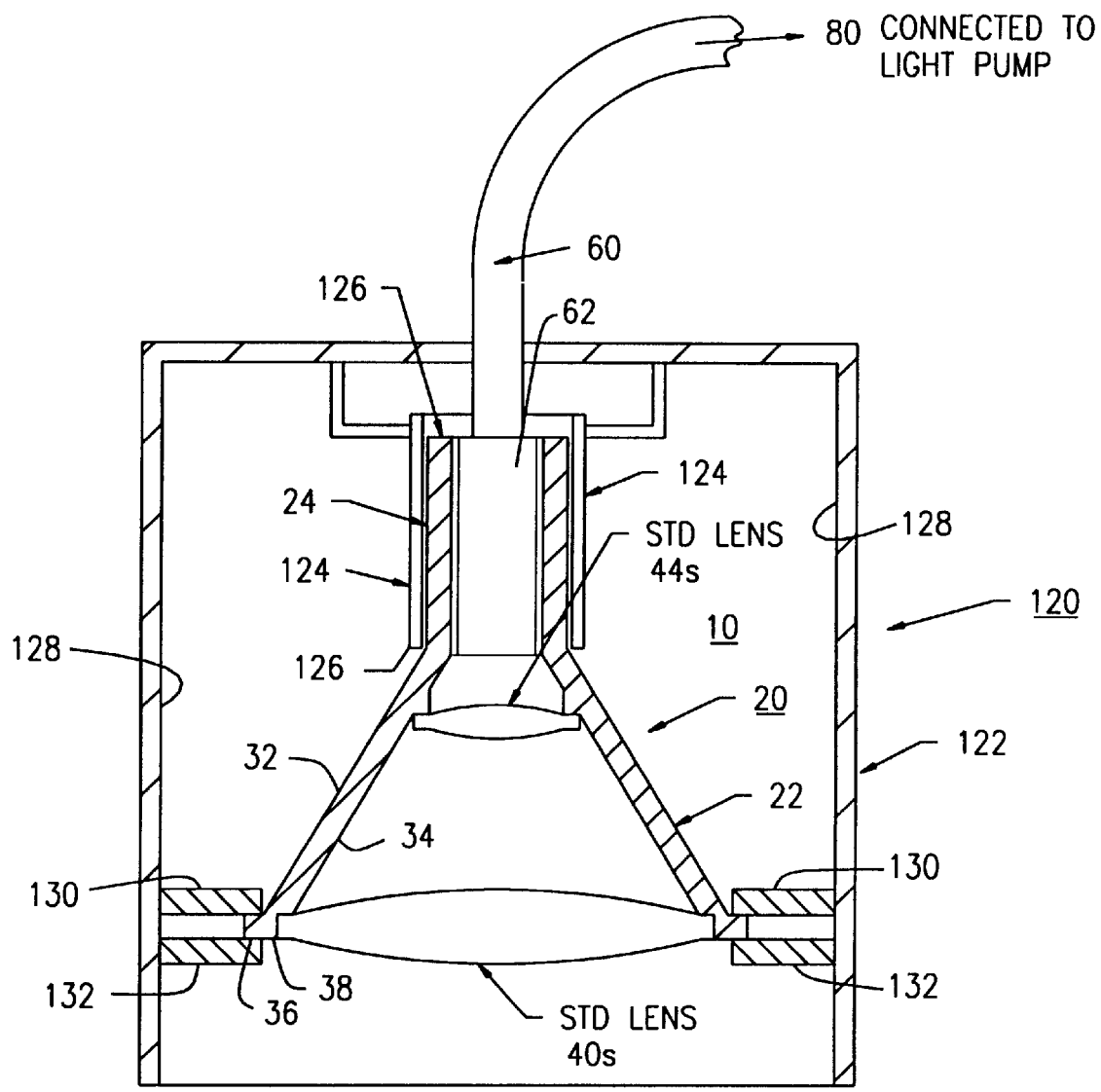
FIG. 15 is a cross-sectional view of the fiber optic replicant lamp of the present invention taken along lines 13—13 of FIG. 12 showing the replicant lamp mounted within a socket member of a fixture housing of the lighting fixture assembly.

As shown in FIG. 14, stem section 24 is received within a socket member 124 having a socket passageway 126 of the fixture housing 122 of lighting fixture 120. Stem section 24 is received within socket member 124 by connection means such as gluing, clamping, pressure springs, set-screws, or threading means. Stem section 24 includes an outer wall surface 52 having spiral threads thereon (not shown) which are received within the socket passageway 126 having spiral receiving threads (not shown). Fixture housing 122, as shown in FIGS. 14 and 15 of the drawings, also includes an interior wall surface 128 having a circular ledge 130 and a circular holding ring 132 thereon for retaining and holding in place the outer perimeter edge 36 of the reflector section 22 of lamp housing 20.

OPERATION OF THE INVENTION

In operation, the user places the plurality of lighting fixtures 120 in an appropriate location for lighting a particular area of a room, theater, convention hall and the like. The user then places an empty lamp housing 20 (without the fiber optic cable) into each of the fixture housings 122 of lighting fixtures 120, such that the stem section 24 of the lamp housing 20 is received within the socket passageway 126 of socket member 124 of fixture housing 122, as shown in FIGS. 13, 14 and 15 of the drawings.

Next, the user selects the appropriate lens 40 or 44, or optionally both lenses 40 and 44 for the lighting effect desired for a particular area or areas. The user then snaps the appropriate lens or lenses 40 and/or 44 into the first and/or second circular ledges 38 and/or 42 for holding lens or lenses 40 and/or 44 in place, as shown in detail by FIG. 13 of the drawings.

The user now inserts the plurality of fiber optic cables 60 from the light pump 80 into each of the lamp housings 20 of the fiber optic replicant lamps 10A to 10F. As shown in FIG. 13, each of the cable housings 62 of fiber optic cables 60 are inserted into the interior passageways 58 of each stem section 24 for receiving cable housing 62 of fiber optic cable 60 therethrough for providing and transmitting light to each fiber optic replicant lamp 10A to 10F from light pump 80.

Figure 7B:
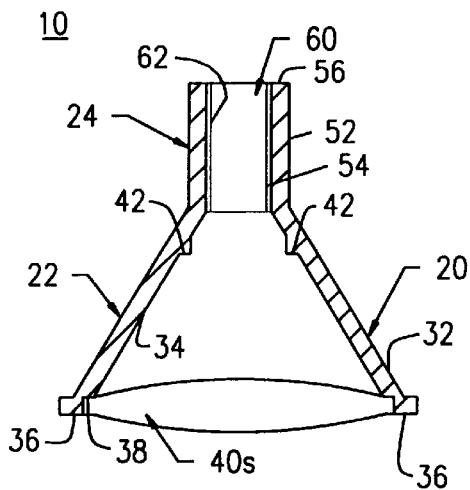
FIG. 7b is a cross-sectional view of the fiber optic replicant lamp of the present invention taken along lines 7b—7b of FIG. 7a showing the lamp housing having a reflector section with a single convex lens mounted therein, and a stem section with an interior passageway for holding in place the fiber optic cable housing having the fiber optic cable therein.

The final step is to turn ON the plurality of fiber optic replicant lamps 10A to 10F of lighting fixtures 120 by a power switch 94 from power supply 90. Power supply 90 supplies electrical current via electrical connection wire 92, as shown in FIG. 13, such that light source 82 is activated within light pump 80. The plurality of fiber optic cables 60 receive and transmit light rays 12 from the light source 82 through the plurality of fiber optic cables 60 to each of the reflector sections 22 of lamp housings 20. The light beams/rays 12 from the fiber optic cable 60 in one of the embodiments are then reflected off of the reflective surface 46 of interior conical wall 34 of the reflector section 22, such that the light beams 12 are focused and channeled through lens 40s to light-up a particular area, as shown in FIG. 7b of the drawings.

The light beams 12 from the fiber optic cable 60 in a second and alternate embodiment are initially focused and channeled through a smaller lens 44, which then have the light beams 12 being reflected off of the reflective surface 46 of interior conical wall 34 of reflector section 22. The reflected light beams 12 are again focused and channeled through a larger lens 40 to light-up a particular area, as shown in FIG. 5b of the drawings.

The light beams 12 from the fiber optic cable 60 in a third and alternate embodiment are focused and channeled through a smaller lens 44s which then have the light beams being reflected off of the reflective surface 46 of interior conical wall 34 of reflector section 22, such that these reflected light beams 12 light-up a particular area, as shown in FIG. 8b of the drawings.

Figure 10A:
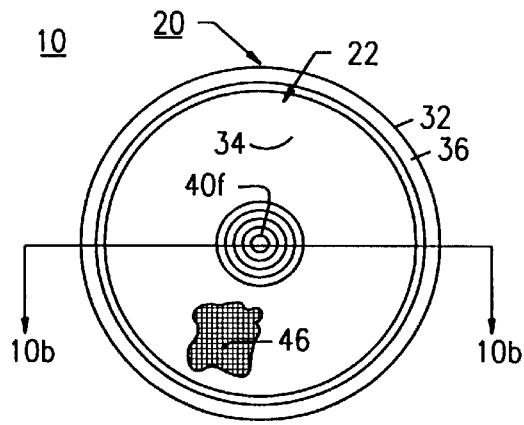
FIG. 10a is a front plan view of the fiber optic replicant lamp of the present invention showing the lamp housing having a reflector section with a reflective surface thereon, and a single smaller Fresnel-type mounted into the retaining ledge of the stem section (not shown)
Figure 10B:
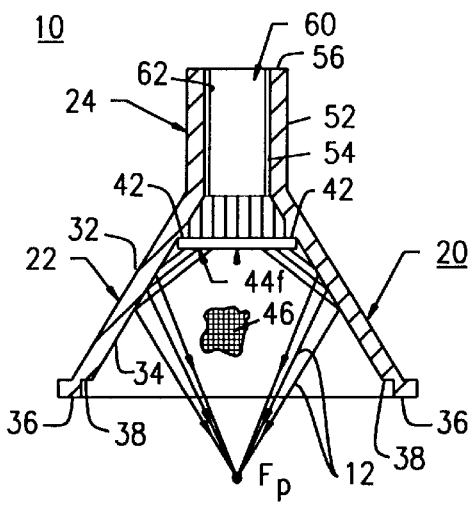
FIG. 10b is a cross-sectional view of the fiber optic replicant lamp of the present invention taken along lines 10b—10b of FIG. 10a showing the lamp housing having a reflector section with reflective surface thereon, a stem section having a retaining ledge for holding a single smaller Fresnel-type lens thereon, and a fiber optic cable housing having a fiber optic cable therein being received within the interior passageway of the stem section.

When the user changes the position of the cable housing 62 of fiber optic bundle 60 within the interior passageways 58 or 78 of stem section 24, the focal point Fp of light beams 12 is adjusted accordingly; or when the user changes the various lenses 40, 44, 48 within the reflector section 22, or the prism lens 50p, mirror lens 50m within stem section 24, the focal point Fp of light beams 12 is also changed accordingly, as shown in FIG. 10b.

When light source 82 becomes de-activated (burnt-out) the user simply removes the burnt-out light source 82 and replaces it (i.e. incandescent light bulb 84) with a new light source 82' within light pump 80 to re-light the plurality of fiber optic cables 60 connected to the light pump 80. The user is only changing the light-source 82 once at a remote location for a plurality of lamps (approximately every 2000 working hours) instead of changing a multitude of conventional lamps 100 within the lighting fixtures 120 when each of the conventional lamps burns-out, as this would be a very time consuming and expensive process. Additionally, the user may also change the type of light source 82 (e.g. from a incandescent bulb 84 to a halogen lamp 88) at the remote location to effect a particular lighting mood or lighting environment. This change of light sources 82' is done at the light pump 80 only once, instead of numerous times at the lighting fixtures in the conventional manner. Additionally, the single light source is located at a remote location and changed every 2000 hours without the manipulation of any of the light fixtures having the replicant lamp therein.

Advantages of the Present Invention

Accordingly, an advantage of the present invention is that it provides for a fiber optic replicant lamp as a replacement for standard incandescent light bulbs or reflector lamps, such as a MR11 or MR16 or PAR lamps and the like.

Another advantage of the present invention is that it provides for a fiber optic replicant lamp having a fiber optic cable/bundle attached to the stem section therein for providing light within the replicant lamp.

Another advantage of the present invention is that it provides for a fiber optic replicant lamp wherein the fiber optic cable/bundle is attached at the other end to a light pump having at least one light source.

Another advantage of the present invention is that it provides for a fiber optic replicant lamp that would not generate an internal heat within the replicant lamp.

Another advantage of the present invention is that it provides for a light pump having a plurality of fiber optic cables/bundles attached to a plurality of fiber optic replicant lamps for producing light from a single light source (such as an incandescent light bulb) via the light pump.

Another advantage of the present invention is that it provides for a fiber optic replicant lamp that saves on energy and maintenance costs, as well as having more flexibility by the user in arranging the plurality of lighting fixtures having the fiber optic replicant lamps therein.

Another advantage of the present invention is that it provides for a fiber optic replicant lamp that can be used within any type of lighting fixture housing.

A still further advantage of the present invention is that it provides for a fiber optic replicant lamp that can be mass produced in an automated and economical manner and is readily affordable by the consumer.

A latitude of modification, change, and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein.

What is claimed is:

1. A fiber optic lamp, comprising:
   a) a lamp housing including a stem section having a passageway therein and a reflector section having a first reflective surface;
   b) said lamp housing having means for receiving and holding in place at least one lens within said lamp housing;
   c) a fiber optic cable having first and second ends thereon;
   d) said passageway of said stem section for receiving therein said first end of said fiber optic cable for transmitting light therethrough;
   e) said second end of said fiber optic cable connected to a light source for generating and transmitting light through said fiber optic cable;
   f) means for mounting said stem section in a light fixture housing; and
   g) wherein said passageway includes means for changing the position of said first end of said fiber optic cable therein for changing focal point of light transmitted from said lamp housing.

2. A fiber optic lamp in accordance with claim 1, wherein said means for receiving and holding in place at least one lens within said lamp housing includes a first circular ledge connected to the outer perimeter edge of said reflector section and a second circular ledge connected to the interior wall on said stem section; said first and second circular ledges being spaced apart from each other.

3. A fiber optic lamp in accordance with claim 1, wherein reflective surface is selected from the group consisting of metalized plastic, phosphorous coatings, polished metals and combinations thereof.

4. A fiber optic lamp in accordance with claim 1, wherein said reflector section has a conical-shaped wall configuration.

5. A fiber optic lamp in accordance with claim 4, wherein said conical-shaped wall has an angle in the range of 50 to 65° degrees with respect to said outer perimeter edge of said reflector section.

6. A fiber optic lamp in accordance with claim 1, wherein said reflector section has a spherical-shaped wall configuration.

7. A fiber optic lamp in accordance with claim 1, wherein said reflector section has an ovoidal-shaped wall configuration.

8. A fiber optic lamp in accordance with claim 1, wherein said reflector section has an ellipsoidal-shaped wall configuration.

9. A fiber optic lamp in accordance with claim 1, wherein said lamp housing is made of light-weight, heat resistant plastic or made of light-weight, shatter proof glass.

10. A fiber optic lamp in accordance with claim 1, further including a light pump, said second end of said fiber optic cable being connected to said light pump.

11. A fiber optic lamp in accordance with claim 1, said means for mounting said stem section includes a clamp or a threaded member.

12. A fiber optic lamp in accordance with claim 1, wherein said at least one lens within said lamp housing is selected from the group consisting of a standard convex lens, a Fresnel™-type lens, a spherical lens, a prism lens, a mirror lens and equivalents thereof.

13. A fiber optic lamp in accordance with claim 1, wherein said reflector section further includes a reflector member having a second reflective surface for reflecting light off of said second reflective surface of said reflector member in order to reduce glare from the light coming from said first reflective surface of said reflector section.

14. A fiber optic lamp in accordance with claim 1, wherein said stem section has an L-shaped configuration having first and second passageways; wherein first passageway extends outwardly at a 90° degree right angle from said second passageway.

15. A fiber optic lamp in accordance with claim 14, wherein said first passageway is used for receiving said fiber optic cable and said second passageway is used for holding in place a prism lens or a mirror lens therein.

16. A fiber optic lamp in accordance with claim 1, wherein said housing includes means in at least two positions for receiving a lens within said lamp housing for changing the focal point of light transmitted from said lamp housing.

17. A fiber optic lamp in accordance with claim 1, wherein said at least one lens within said lamp housing includes two lenses, said two lenses being mounted in a spaced-apart relation within said reflector section.

18. A fiber optic lamp in accordance with claim 1, wherein said at least one lens within said lamp housing includes two lenses, one being an outer lens and the other lens being an inner lens.

19. A fiber optic lamp in accordance with claim 1, wherein said reflector section has a parabolic-shaped wall configuration.

20. A fiber optic lamp in accordance with claim 1, wherein said reflector section has a semi-circular shaped wall configuration.

21. A fiber optic lamp in accordance with claim 1, wherein said fiber optic lamp has the shape of a conventional lamp.

22. A fiber optic lamp, comprising:
a) a lamp housing including a stem section having a passageway therein and reflector section having a reflective surface;
b) a fiber optic cable having first and second ends thereon;
c) said passageway of said stem section for receiving therein said first end of said fiber optic cable for transmitting light therethrough;
d) said second end of said fiber optic cable connected to a light source for generating and transmitting light through said fiber optic cable;
e) means for mounting said stem section in a light fixture housing; and
f) wherein said passageway includes means for changing the position of said first end of said fiber optic cable therein for changing the focal point of light transmitted from said lamp housing.

23. A fiber optic lamp in accordance with claim 22, further including a reflective surface selected from the group consisting of metalized plastic, phosphorous coatings, polished metals and combinations thereof.

24. A fiber optic lamp in accordance with claim 22, wherein said reflector section has a conical-shaped wall configuration.

25. A fiber optic lamp in accordance with claim 24, wherein said conically-shaped wall has an angle in the range of 50 to 65° degrees with respect to said outer perimeter edge of said reflector section.

26. A fiber optic lamp in accordance with claim 22, wherein said reflector section has a spherical-shaped wall configuration.

27. A fiber optic lamp in accordance with claim 22, wherein said reflector section has an ovoidal-shaped wall configuration.

28. A fiber optic lamp in accordance with claim 22, wherein said reflector section has an ellipsoidal-shaped wall configuration.

29. A fiber optic lamp in accordance with claim 22, wherein said lamp housing is made of light-weight, heat resistant plastic or made of light-weight, shatter proof glass.

30. A fiber optic lamp in accordance with claim 22, further including a light pump, said second end of said fiber optic cable being connected to said light pump.

31. A fiber optic lamp in accordance with claim 22, said means for mounting said stem section includes a clamp or a threaded member.

32. A fiber optic lamp in accordance with claim 22, further including at least one lens within said lamp housing, said at least one lens being selected from the group consisting of a standard convex lens, a Fresnel™-type lens, a spherical lens, a prism lens, a mirror lens and equivalents thereof.

33. A fiber optic lamp in accordance with claim 32, wherein said housing includes means in at least two positions for receiving a lens within said lamp housing for changing the focal point of light transmitted from said lamp housing.

34. A fiber optic lamp in accordance with claim 22, wherein said reflector section further includes a reflector member having a reflective member surface for reflecting light off of said reflective member surface of said reflector member in order to reduce glare from the light coming from said reflective surface of said reflector section.

35. A fiber optic lamp in accordance with claim 22, wherein said stem section has an L-shaped configuration having first and second passageways; wherein first passageway extends outwardly at a 90° degree right angle from said second passageway.

36. A fiber optic lamp in accordance with claim 35, wherein said first passageway is used for receiving said fiber optic cable and said second passageway is used for holding in place a prism lens or a mirror lens therein.

37. A fiber optic lamp, comprising:
 a) a plurality of lamp housings each including a stem section having a passageway therein and a reflector section having a reflective surface;
 b) each of said lamp housings having means for receiving and holding in place at least one lens within said lamp housing including a first ledge connected to said reflector section and a second ledge connected to said stem section; said first and second ledges being spaced apart from each other;
 c) a plurality of fiber optic cables each having first and second ends thereon;
 d) said passageway of each of said stem sections for receiving therein one of said plurality of said first ends of said fiber optic cables for transmitting light therethrough;
 e) one of said plurality of second ends of said fiber optic cables being connected to a light source for transmitting light through said fiber optic cables; wherein said light source is in the form of a light pump having each of said second ends of said fiber optic cables being connected to said light pump; and
 f) means for mounting each of said stem sections in a plurality of light fixture housings.

38. A fiber optic lamp, comprising:
 a) a lamp housing including a stem section having a passageway therein and a reflector section having a first reflective surface;
 b) said lamp housing having means for receiving and holding in place at least one lens within said lamp housing; said housing includes means in at least two positions for receiving a lens within said lamp housing for changing the focal point of light transmitted from said lamp housing;
 c) a fiber optic cable having first and second ends thereon;
 d) said passageway of said stem section for receiving therein said first end of said fiber optic cable for transmitting light therethrough;
 e) said second end of said fiber optic cable being connected to a light source for transmitting light through said fiber optic cable;
 f) means for mounting said stem section in a light fixture housing; and
 g) a reflector member having a second reflective surface for reflecting light for reducing glare from the light coming from said first reflective surface of said reflector section.

39. A fiber optic lamp, comprising:
 a) a lamp housing including a stem section having a passageway therein and a reflector section having a reflective surface;
 b) said lamp housing having means for receiving and holding in place at least one lens within said lamp housing; said housing includes means in at least two positions for receiving a lens within said lamp housing for changing the focal point of light transmitted from said lamp housing;
 c) a fiber optic cable having first and second ends thereon;
 d) said passageway of said stem section for receiving therein said first end of said fiber optic cable for transmitting light therethrough;
 e) said second end of said fiber optic cable being connected to a light source for transmitting light through said fiber optic cable;
 f) said light source being a light pump and said second end of said fiber optic cable being connected to said light pump; and
 g) means for mounting said stem section in a light fixture housing.

40. A fiber optic lamp, comprising:
 a) a lamp housing including a stem section having a passageway therein and a reflector section having a reflective surface;
 b) said lamp housing having means for receiving and holding in place at least one lens within said lamp housing;
 c) a fiber optic cable having first and second ends thereon;
 d) said passageway of said stem section for receiving therein said first end of said fiber optic cable for transmitting light therethrough; said passageway of said stem section includes means for changing the position of said first end of said fiber optic cable therein for changing the focal point of light transmitted from said lamp housing;
 e) said second end of said fiber optic cable being connected to a light source for transmitting light through said fiber optic cable; and
 f) means for mounting said stem section in a light fixture housing.

41. A fiber optic lamp, comprising;
 a) a lamp housing including a stem section having a passageway therein and a reflector section having a reflective surface;
 b) said lamp housing having means for receiving and holding in place at least one lens within said lamp housing; said housing includes means in at least two positions for receiving a lens within said lamp housing for changing the focal point of light transmitted from said lamp housing;
 c) a fiber optic cable having first and second ends thereon;
 d) said passageway of said stem section for receiving therein said first end of said fiber optic cable for transmitting light therethrough;
 e) said second end of said fiber optic cable being connected to a light source for transmitting light through said fiber optic cable; and
 f) means for mounting said stem section in a light fixture housings.

42. A fiber optic lamp, comprising:
 a) a lamp housing including a stem section having a passageway therein and a reflector section having a reflective surface;
 b) a fiber optic cable having first and second ends thereon;
 c) said passageway of said stem section for receiving therein said first end of said fiber optic cable for transmitting light therethrough; said passageway of said stem section includes means for changing the position of said first end of said fiber optic cable therein for changing the focal point of light transmitted from said lamp housing;
 d) said second end of said fiber optic cable being connected to a light source for transmitting light through said fiber optic cable; and
 e) means for mounting said stem section in a light fixture housing.

\* \* \* \* \*